United States Patent
Mansee

(10) Patent No.: US 7,240,098 B1
(45) Date of Patent: Jul. 3, 2007

(54) SYSTEM, METHOD, AND SOFTWARE FOR A VIRTUAL HOST BUS ADAPTER IN A STORAGE-AREA NETWORK

(75) Inventor: Mark Thomas Mansee, Vadnais Heights, MN (US)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 10/143,456

(22) Filed: May 9, 2002

(51) Int. Cl.
G06F 3/00 (2006.01)
G06F 9/455 (2006.01)
G06F 13/12 (2006.01)
G06F 15/167 (2006.01)
G06F 15/16 (2006.01)

(52) U.S. Cl. .................. 709/212; 709/250; 703/25; 710/72; 719/324; 719/326

(58) Field of Classification Search ........ 719/321–327; 703/24, 25, 27; 710/8, 63, 72–74; 709/212, 709/250
See application file for complete search history.

(56) References Cited

U.S. PATENT DOCUMENTS

| | | | |
|---|---|---|---|
| 4,495,617 A | 1/1985 | Ampulski et al. | |
| 5,390,326 A | 2/1995 | Shah | |
| 5,461,608 A | 10/1995 | Yoshiyama | |
| 5,473,599 A | 12/1995 | Li et al. | |
| 5,535,395 A | 7/1996 | Tipley et al. | |
| 5,544,077 A | 8/1996 | Hershey | |
| 5,579,491 A | 11/1996 | Jeffries et al. | |
| 5,600,828 A | 2/1997 | Johnson et al. | |
| 5,666,486 A | 9/1997 | Alfieri et al. | |
| 5,732,206 A | 3/1998 | Mendel | |
| 5,812,821 A | 9/1998 | Sugi et al. | |
| 5,832,299 A * | 11/1998 | Wooten | 710/9 |
| 5,850,573 A * | 12/1998 | Wada | 710/62 |
| 5,870,571 A | 2/1999 | Duburcq et al. | |
| 5,909,544 A | 6/1999 | Anderson et al. | |
| 5,951,683 A | 9/1999 | Yuuki et al. | |
| 5,991,813 A | 11/1999 | Zarrow | |
| 5,996,024 A | 11/1999 | Blumenau | |
| 5,996,027 A | 11/1999 | Volk et al. | |
| 6,006,259 A | 12/1999 | Adelman et al. | |

(Continued)

OTHER PUBLICATIONS

*VMware ESX Server: User's Manual*, Version 1.0, obtained from http://web.archive.org/web/20010608201203/www.vmware.com/support, (Jun. 6, 2001), 122-124.

(Continued)

*Primary Examiner*—Bunjob Jaroenchonwanit
*Assistant Examiner*—Ramsey Refai
(74) *Attorney, Agent, or Firm*—Schwegman, Lundburg, Woessner & Kluth P.A.

(57) ABSTRACT

Accessing some storage-area networks (SANs) requires a client computer to include a special electronic component, known as a host bus adapter (HBA). However, the present inventor recognized that conventional host bus adapters add considerable expense to the cost of accessing the storage-area network. Accordingly, the present inventor devised a host bus adapter that is implemented in software and thus referred to as a "virtual" host bus adapter. One exemplary embodiment of the virtual host bus adapter includes a hardware-emulation module that makes the virtual host bus adapter appear to operating system environments as a conventional host bust adapter with dedicated hardware.

7 Claims, 2 Drawing Sheets

U.S. PATENT DOCUMENTS

| | | | |
|---|---|---|---|
| 6,009,476 A * | 12/1999 | Flory et al. ............... | 719/324 |
| 6,009,480 A * | 12/1999 | Pleso ........................ | 719/321 |
| 6,018,765 A | 1/2000 | Durana et al. | |
| 6,041,381 A | 3/2000 | Hoese | |
| 6,078,957 A | 6/2000 | Adelman et al. | |
| 6,108,300 A | 8/2000 | Coile et al. | |
| 6,108,699 A | 8/2000 | Moiin | |
| 6,131,119 A | 10/2000 | Fukui | |
| 6,134,673 A | 10/2000 | Chrabaszcz | |
| 6,145,019 A | 11/2000 | Firooz et al. | |
| 6,163,855 A | 12/2000 | Shrivastava et al. | |
| 6,178,445 B1 | 1/2001 | Dawkins et al. | |
| 6,185,620 B1 | 2/2001 | Weber et al. | |
| 6,195,687 B1 | 2/2001 | Greaves et al. | |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 | 11/2001 | Arendt et al. | |
| 6,343,320 B1 | 1/2002 | Fairchild et al. | |
| 6,363,416 B1 | 3/2002 | Naeimi et al. | |
| 6,378,025 B1 | 4/2002 | Getty | |
| 6,393,583 B1 | 5/2002 | Meth et al. | |
| 6,400,730 B1 | 6/2002 | Latif et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,574,755 B1 | 6/2003 | Seon | |
| 6,591,310 B1 | 7/2003 | Johnson | |
| 6,597,956 B1 | 7/2003 | Aziz et al. | |
| 6,640,278 B1 | 10/2003 | Nolan et al. | |
| 6,654,830 B1 | 11/2003 | Taylor et al. | |
| 6,658,459 B1 * | 12/2003 | Kwan et al. ............... | 709/217 |
| 6,678,721 B1 | 1/2004 | Bell | |
| 6,683,883 B1 * | 1/2004 | Czeiger et al. ............ | 370/401 |
| 6,691,244 B1 | 2/2004 | Kampe et al. | |
| 6,697,924 B2 | 2/2004 | Swank | |
| 6,701,449 B1 | 3/2004 | Davis et al. | |
| 6,718,361 B1 | 4/2004 | Basani et al. | |
| 6,721,907 B2 | 4/2004 | Earl | |
| 6,724,757 B1 | 4/2004 | Zadikian et al. | |
| 6,748,550 B2 | 6/2004 | McBrearty et al. | |
| 6,757,291 B1 | 6/2004 | Hu | |
| 6,760,783 B1 * | 7/2004 | Berry ........................ | 719/318 |
| 6,763,195 B1 | 7/2004 | Willebrand et al. | |
| 6,763,419 B2 | 7/2004 | Hoese et al. | |
| 6,766,520 B1 * | 7/2004 | Rieschl et al. ............. | 719/321 |
| 6,771,663 B1 | 8/2004 | Jha | |
| 6,771,673 B1 | 8/2004 | Baum et al. | |
| 6,799,316 B1 * | 9/2004 | Aguilar et al. ............ | 718/1 |
| 6,807,581 B1 | 10/2004 | Starr et al. | |
| 6,823,418 B2 * | 11/2004 | Langendorf et al. ....... | 719/324 |
| 6,856,591 B1 | 2/2005 | Ma et al. | |
| 6,859,462 B1 | 2/2005 | Mahoney et al. | |
| 6,877,044 B2 | 4/2005 | Lo et al. | |
| 6,886,171 B2 * | 4/2005 | MacLeod .................. | 719/324 |
| 6,895,461 B1 | 5/2005 | Thompson | |
| 6,920,491 B2 | 7/2005 | Kim | |
| 6,938,092 B2 | 8/2005 | Burns | |
| 6,944,785 B2 | 9/2005 | Gadir et al. | |
| 2002/0010750 A1 | 1/2002 | Baretzki | |
| 2002/0042693 A1 | 4/2002 | Kampe et al. | |
| 2002/0049845 A1 | 4/2002 | Sreenivasan et al. | |
| 2002/0055978 A1 | 5/2002 | Joon-Bo et al. | |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0005068 A1 | 1/2003 | Nickel et al. | |
| 2003/0018813 A1 | 1/2003 | Antes et al. | |
| 2003/0018927 A1 | 1/2003 | Gadir et al. | |
| 2003/0058870 A1 | 3/2003 | Mizrachi et al. | |
| 2003/0084209 A1 | 5/2003 | Chadalapaka | |
| 2003/0097607 A1 | 5/2003 | Bessire | |
| 2003/0182455 A1 | 9/2003 | Hetzler et al. | |
| 2003/0208579 A1 | 11/2003 | Brady et al. | |
| 2003/0210686 A1 | 11/2003 | Terrell et al. | |
| 2004/0024778 A1 | 2/2004 | Cheo | |
| 2004/0064553 A1 | 4/2004 | Kjellberg | |
| 2004/0141468 A1 | 7/2004 | Christensen | |
| 2004/0233910 A1 | 11/2004 | Chen et al. | |
| 2005/0055418 A1 | 3/2005 | Blanc et al. | |
| 2005/0063313 A1 | 3/2005 | Nanavati et al. | |
| 2005/0268151 A1 | 12/2005 | Hunt et al. | |

OTHER PUBLICATIONS

Bakker, G. , *IP Aliasing*, obtained from http://www.zone-h.org/files/24/ip_aliasing.txt, (1999), 3 p.

Gusella, R. , et al., "An Election Algorithm for a Distributed Clock Synchronization Program", *CS Technical Report #275*, University of California, Berkeley, (Dec. 1985), p. 1-14.

Gusella, R. , et al., "The Berkeley UNIX Time Synchronization Protocol", *UNIX Programmers Manual 4.3*, vol. 2C, Berkeley Software Distrib., (1986), 10 p.

Knight, S. , et al., *Virtual Router Redundancy Protocol*, Network Working Group, RFC 2338, obtained from http://www.search.ietf.org/rfc/rfc2338.txt, (1998), 26 p.

Lewis, P. , "A High-Availability Cluster for Linux", *Linux Journal 64*, obtained from http://www2.linuxjournal.com/lj-issues/issue64/3247.html, (Apr. 1994), 11 p.

Li, T. , et al., *Cisco Hot Standby Router Protocol (HSRP)*, Network Working Group, RFC 2281, obtained from http://www.search.ietf.org/rfc/rfc2281.txt, (1998), 16 p.

Meth, K. Z., et al., "Design of the iSCSI protocol", *Proceedings of the 20th IEEE Conference on Mass Storage Systems and Technologies*, (Apr. 7-10, 2003), 116-122.

Moore, K. , *On the Use of HTTP as a Substrate*, Network Working Group, RFC 3205, obtained from http://www.search.ietf.org/rfc/rfc3205.txt, (2002), 14 p.

Satran, J. , et al., *iSCSI*, IPS Internet Draft, draft-ietf-ips-iSCSI-12.txt, Category: Standards Track, (Apr. 17, 2002), 260 p.

Satran, J. , et al., *iSCSI*, IPS Internet Draft, draft-ietf-ips-iSCSI-00, Category: Standards Track, obtained from http://www.haifa.il.ilb.com/satran/ips/draft-ietf-ips-iSCSI-00.txt, (Nov. 2000), 78 p.

Simitci, H. , et al., "Evaluation of SCSP over TCP/IP and SCSI over fibre channel connections", *Hot Interconnects*, 9, (Aug. 2001), 87-91.

\* cited by examiner

US 7,240,098 B1

SYSTEM, METHOD, AND SOFTWARE FOR A VIRTUAL HOST BUS ADAPTER IN A STORAGE-AREA NETWORK

RELATED APPLICATIONS

This invention is related to application Ser. No. 10/122,401, filed Apr. 11, 2002, entitled "METHOD AND APPARATUS FOR SUPPORTING COMMUNICATIONS BETWEEN NODES OPERATING IN A MASTER-SLAVE CONFIGURATION", which is a continuation of application Ser. No. 09/949,182, filed Sep. 7, 2001, entitled "METHOD AND APPARATUS FOR SUPPORTING COMMUNICATIONS BETWEEN NODES OPERATING IN A MASTER-SLAVE CONFIGURATION"; application Ser. No. 10/094,552, filed Mar. 7, 2002, entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION"; application Ser. No. 10/131,275, filed Apr. 22, 2002, entitled "METHOD AND APPARATUS FOR CONFIGURING NODES AS MASTERS OR SLAVES"; application Ser. No. 10/131,274, filed Apr. 22, 2002, entitled "METHOD AND APPARATUS FOR TERMINATING APPLICATIONS IN A HIGH-AVAILABILITY NETWORK"; application Ser. No. 10/128,656, filed Apr. 22, 2002, entitled "SCSI-BASED STORAGE AREA NETWORK"; application Ser. No. 10/131,793, filed Apr. 22, 2002, entitled "VIRTUAL SCSI BUS FOR SCSI-BASED STORAGE AREA NETWORK"; application Ser. No. 10/131,782, filed Apr. 22, 2002, entitled "VIRTUAL MAC ADDRESS SYSTEM AND METHOD"; application Ser. No. 10/128,655, filed Apr. 22, 2002, entitled "SYSTEM AND METHOD FOR CONFIGURING FIBRE-CHANNEL DEVICES"; application Ser. No. 10/131,789, filed Apr. 22, 2002, entitled "METHOD AND APPARATUS FOR ASSOCIATING AN IP ADDRESS AND INTERFACE TO A SCSI ROUTING INSTANCE"; application Ser. No. 10/128,657, filed Apr. 22, 2002, entitled "METHOD AND APPARATUS FOR EXCHANGING CONFIGURATION INFORMATION BETWEEN NODES OPERATING IN A MASTER-SLAVE CONFIGURATION"; application Ser. No. 10/128,993, filed Apr. 22, 2002, entitled "SESSION-BASED TARGET/LUN MAPPING FOR A STORAGE AREA NETWORK AND ASSOCIATED METHOD"; application Ser. No. 10/143,503, filed even date herewith, entitled "SYSTEM AND METHOD FOR INCREASED VIRTUAL DRIVER THROUGHPUT"; application Ser. No. 10/143,561, filed even date herewith, entitled "SYSTEM, METHOD, AND SOFTWARE FOR TARGET ID BINDING IN A STORAGE-AREA NETWORK"; application Ser. No. 10/143,560, filed even date herewith, entitled "SYSTEM AND METHOD FOR DELAYED ERROR HANDLING"; application Ser. No. 10/143,493, filed even date herewith, entitled "LATENCY REDUCTION IN NETWORK DATA TRANSFER OPERATIONS"; all of the above of which are hereby incorporated by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Cisco Systems, Inc. All Rights Reserved

TECHNICAL FIELD

The present invention concerns networking and input-output adapters for facilitating block data transfers between computers and peripheral storage devices across a computer network

BACKGROUND

In recent years, the rapid growth of the Internet and other computer networks has fueled an equally fantastic growth in the use of computers as everyday communications devices for both individuals and businesses. Such widespread and growing use has led to the generation and accumulation of vast amounts of digital data. This, in turn, has spurred scientists and engineers to develop specialized subsystems, such as storage-area networks, for managing and storing data.

A storage-area network is a high-speed subnetwork of shared data-storage devices, such as disk drives. Storage-area networks are particularly advantageous because users of individual computers and computer networks, for example, corporate intranets, can directly or indirectly buy access to large data storage capacity without having to buy or maintain the additional data-storage devices themselves.

Some storage-area networks (SANs) are structured so that an end-user or client computer can access data on one or more target storage devices through an intermediate device, such as a storage router or a fiber-channel switch. The client computer generally includes a special electronic component, known as a host bus adapter (HBA). The adapter, which interfaces with the computer's operating system via a driver program, plugs into an expansion slot on the client computer, enabling the computer to communicate with the intermediate device and thus to access the target storage devices.

However, the present inventor recognized that conventional host bus adapters are problematic for at least four reasons. First, host bus adapters have highly complex electronic circuitry and thus adds considerable expense to the cost of the storage-area network. Second, the permanent nature of the circuitry limits flexibility to adapt to changes in the storage router or other intermediate devices. Third, every host bus adapter consumes one expansion slot on a host computer and thus limits further expansion of the client computer. And fourth, the host bus adapter sometimes includes circuits, such as network interfacing circuits, that are redundant to circuitry already on the client computer.

Accordingly, the present inventor identified a need for alternatives to conventional host bus adapters, particularly those used in storage-area networks.

SUMMARY

To address this and other needs, the present inventor devised a host bus adapter that is implemented in software and thus referred to as a "virtual" host bus adapter. One exemplary embodiment of the virtual host bus adapter includes a hardware-emulation module that makes the virtual host bus adapter appear to operating system environments as a conventional host bust adapter with dedicated hardware.

DETAILED DESCRIPTION OF DRAWINGS

DETAILED DESCRIPTION OF EXEMPLARY EMBODIMENT(S)

Figure 1:
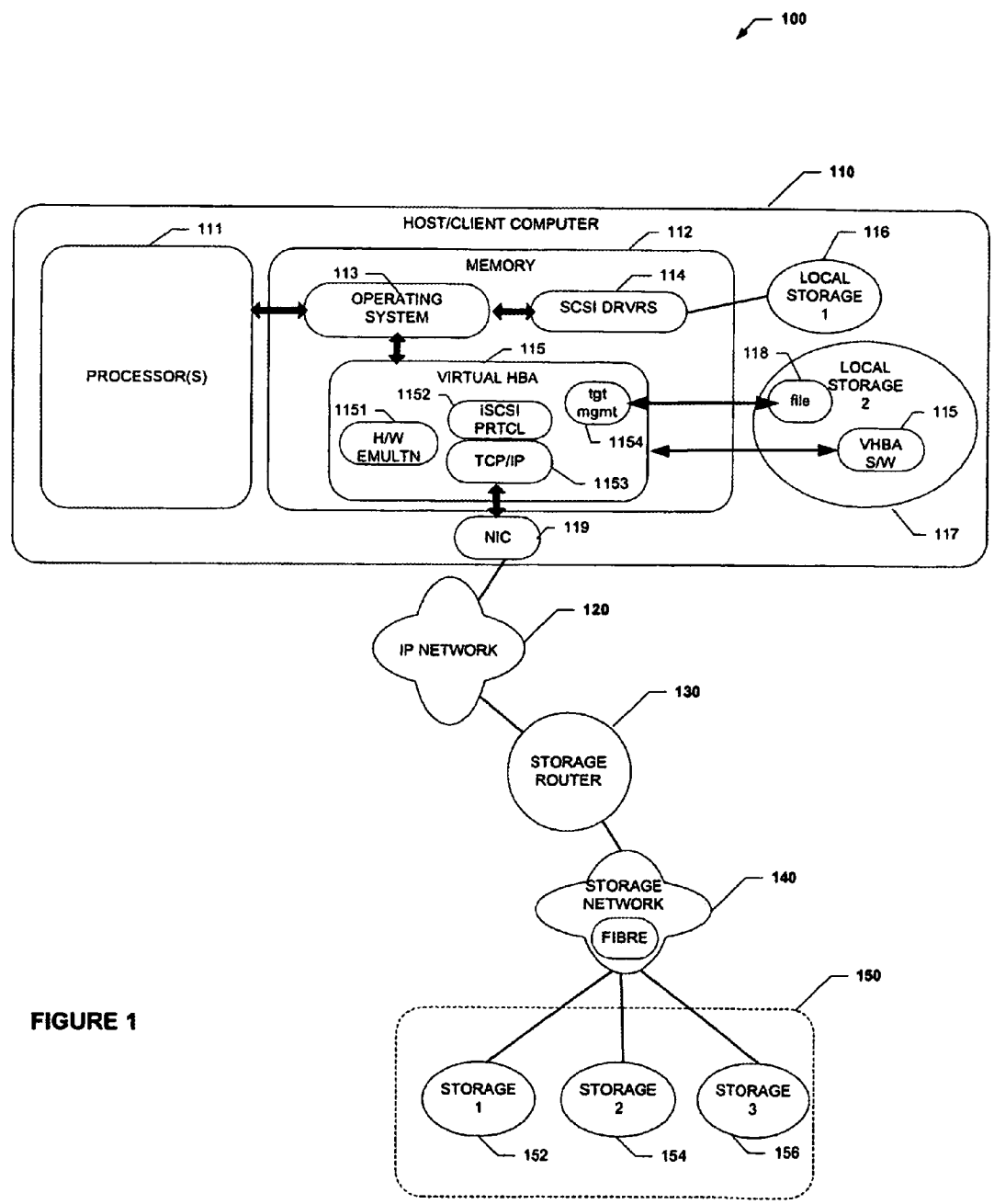
FIG. 1 is a block diagram corresponding to one or more embodiments of the present invention.
Figure 2:
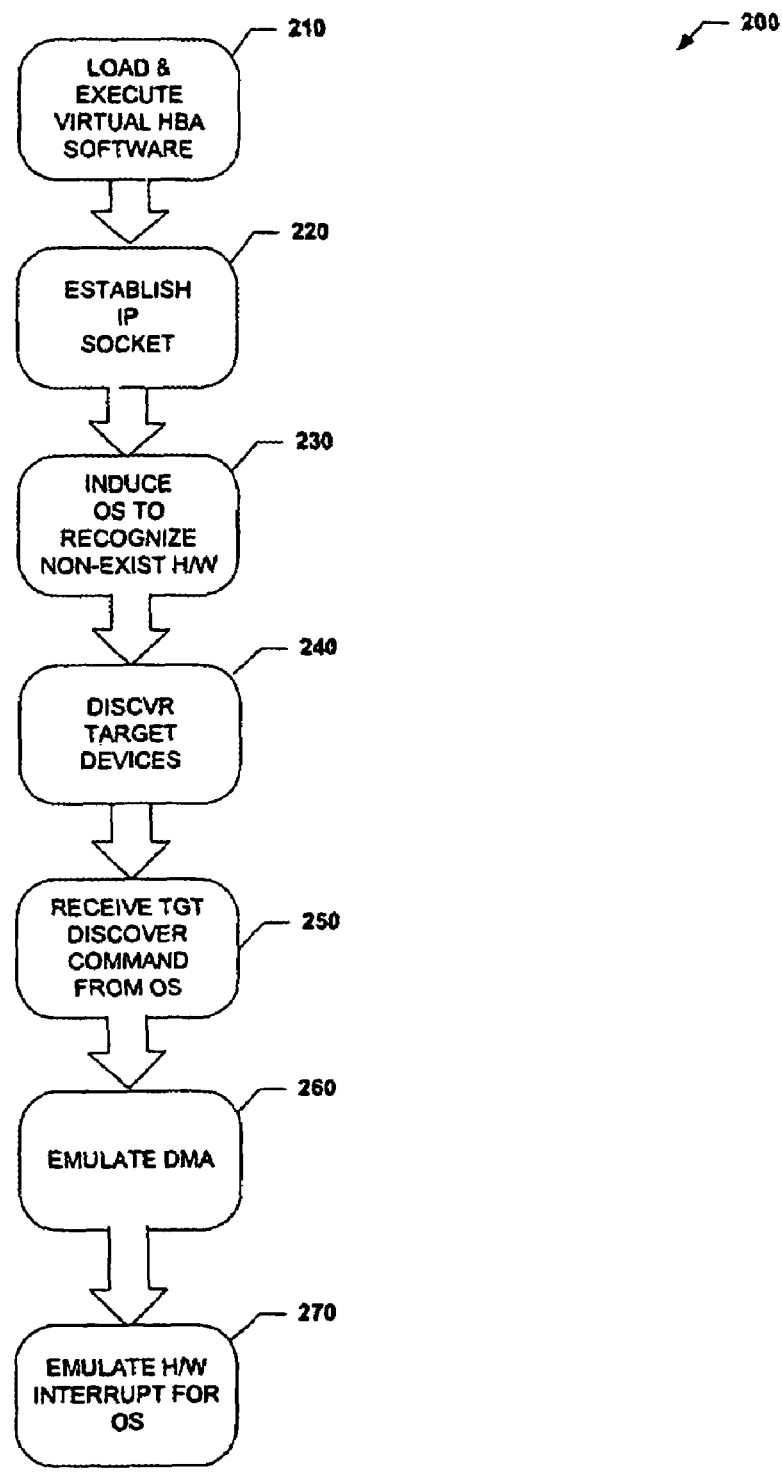
FIG. 2 is a flow chart corresponding to one or more embodiments of the present invention.

The following detailed description, which references and incorporates FIGS. 1 and 2, describes and illustrates specific embodiments of the invention. These embodiments, offered not to limit but only to exemplify and teach the concepts of the invention, are shown and described in sufficient detail to enable those skilled in the art to implement or practice the invention. Thus, where appropriate to avoid obscuring the invention, the description may omit certain information known to those of skill in the art.

FIG. 1 show an exemplary computer system 100 which incorporates teachings of the present invention. System 100 includes a computer 110, an Internet Protocol (IP) network 120, a storage router 130, a storage network 140, and storage devices 150.

More particularly, computer 110 includes one or more processors 111, a memory 112, an operating system 113, a SCSI driver 114, and an virtual host bus adapter 115, local storage devices 116 and 117, a binding file 118, and a network interface card (NIC) 119.

Processors 111, in the exemplary embodiment, includes one or more commercially available processors. Commercial sources of processors (or devices that include processors) include Intel, Sun MicroSystems, Advance Micron Devices, and International Business Machines. However, other embodiments may use other types of processors and computers. Processors 111 are coupled to memory 112.

Memory 112 contains operating system (or environment) 113, SCSI driver 114 and virtual HBA driver 115. In the exemplary embodiment, operating system 113 is a version of the Sun Solaris, Linux, Windows, or AIX. Exemplary versions of Linux include Caldera, Mandrake, RedHat, SuSE, and TurboLinux. However, the invention is not limited in terms of operating system.

SCSI driver 114 conforms to a version of the Small Computer System Interface standard. Exemplary versions of this standard include SCSI-1, SCSI-2, Wide SCSI, Fast SCSI, Fast Wide SCSI, Ultra SCSI, SCSI-3 (Ultra Wide SCSI), Ultra2 SCSI, and Wide Ultra2 SCSI.

Virtual HBA driver 115 (a virtual iSCSI driver) includes a hardware-emulation module 1151, an iSCSI protocol 1152, a TCP/IP socket connection 1153, and a target-name management module 1154. Hardware-emulation module 1151 includes submodules to make virtual HBA driver 115 appear to operating system 113 as a conventional host bus adapter for handling block-level input-output operations.

iSCSI protocol 1152 complies with a version of the Internet Small Computer System Interface (iSCSI) protocol for storage of data over an IP network. This protocol is being defined by the Internet Engineering Task Force (IETF). For more information about the iSCSI protocol, one may refer to the IETF standards for IP storage at http://www.ietf.org. TCP/IP socket connection 1153 is generated by the iSCSI driver.

Target-name-management module 154 accesses and maintains a non-volatile target binding file 118 in local storage device 117. These unique aspects are described in co-pending and co-filed U.S. patent application Ser. No. 10/143,561; Cisco seq. no. 6122), which is incorporated herein by reference.

Local storage devices 116 and 117 are non-volatile storage devices accessible via SCSI driver 114 (or other conventional means). Storage device 117 includes a copy of virtual HBA driver 115 and target binding file 118. In the exemplary embodiment, the VHBA software is downloaded into local storage device 117 from a website or server with authorization credentials provided by the manufacturer or owner of the storage routers or other devices that communicate with the VHBA driver software.

Network interface card 119 is an expansion card or other device with hardware and software for facilitating wireline or wireless communications over a network. In the exemplary embodiment, network interface card 119 is a Gigabit Ethernet Server card, which includes a Gigabit Ethernet driver. Some embodiments enable the extended windowing feature of a version of the Transmission Control Protocol (TCP) for all IP hosts. And some embodiments that use Gigabit Ethernet Server network interface cards enable the receive and transmit flow control feature for better performance. Other embodiments any IP capable interfaces, for example, 10/100 Ethernet, wireless LAN, ATM, etc. Network interface card 119 supports communications via IP network 120 with storage router 130.

Storage router 130, which is coupled to storage devices 150 via storage network 160, supports IP network communications between computer 110 and the router and communications between the router and the storage devices. The exemplary embodiment use the Cisco SN 5420 Storage Router which is available from Cisco Systems of San Jose, Calif. (This router includes functionality described in one or more of the previously referenced patent applications.) Notably, router includes a capability to assign a world-wide unique name to each discovered target.

In some embodiments, storage router 130 is implemented in a 1U rack-mountable chassis that includes the following main hardware components (not shown): processor, Gigabit Ethernet interface, Fibre Channel interface, HA interface, and management interfaces. The invention, however, is not limited to any particular storage router. In still other embodiments, the storage router is sold in conjunction with one or more copies or rights to copy and use the VHBA driver software.

Storage router 130 is coupled to storage devices 150 via storage network 140. In the exemplary embodiment, storage network 140 conforms to a version of the Fibre Channel standard, such as Fibre Channel Arbitrated Loop (FC-AL) standard. However, the invention is not limited to any particular storage-network standard.

Storage devices 150 include one or more target storage devices, of which target storage devices 152, 154, and 156 are generally representative. Each of the target storage devices has an associated logical unit number (not shown.) In the exemplary embodiment, storage devices 150 include one or more disc drives and one or more tape drives. However, the invention is not limited in terms of storage network or storage devices.

In normal exemplary operation, computer 100 accesses one or more of target storage devices 152, 154, and/or 156 through its operating system 113. Operating system 113 forwards a block level input-output command to virtual HBA 115, which in turn calls iSCSI driver 1152. iSCSI driver 1152 communicates the command and any associated data in an appropriate format through TCP/IP socket 1153 and network-interface card 119 and IP network 120 to storage router 130. Storage router 130 reformats and communicates the command and any data through storage network 140 to the appropriate target storage device for handling.

In response to the command and any associated data, the appropriate target storage device communicates data and/or status information through storage network 140 to storage router 130, which in turn reformats according to the iSCSI and TCP/IP protocols and transmits across EP network 120 to network-interface card 119 and ultimately through iSCSI driver 1152 and virtual HBA driver 115 to operating system 113.

Of further interest is an exemplary method of operating virtual HBA driver 115, especially hardware-emulation module 1151, during startup or re-boot of system 100 and post startup. FIG. 2 shows a flowchart 200 illustrating a portion of the exemplary method. Flowchart 200 includes process blocks 210–290. Execution of the exemplary method begins at block 210.

Block 210 entails loading the VHBA driver software from local storage device 117 into memory 112 for execution. Various embodiments initiate loading of the software into memory 112 using mechanisms dependent on the type and/or functionality of operating system 133. For example, UNIX-based operating systems, such as Linus, Solaris, and AIX, use a startup script that is run at boot time. Windows operating systems similarly initiate loading using registry and other specific Windows facilities, such as the Control Panel->Devices Service in Windows NT operating system and Device Manager in the Windows 2000 operating system. Execution continues block 220.

Block 220 entails establishing an TCP/IP socket connection to storage router 130. In some embodiments, for example some Solaris and Linux embodiments, the TCP/IP connection is established using a daemon, and then passed into the virtual HBA driver with IOCTL function calls. When the connection fails or closes, control returns to the initiating daemon. Some Windows and AIX embodiments initiate the TCP connection using kernel calls within the virtual HBA driver.

Block 230 induces the local operating system to falsely recognize the VHBA driver as having associated hardware, and thus to assign it a controller number and a DMA memory address. Execution of this process generally varies based on the form of the local operating system.

For example, in some Windows embodiments, inducing hardware recognition entails issuing a ScsiPortInitialize call into the OS which itself identifies the driver (caller) as being associated with "non-probe-able" hardware, such as an ISA bus device. In general, use of a probe-able-type definition causes probing for the related non-existent hardware and thus defeats the desired recognition.

Some Linux embodiments induce hardware recognition using a scsi_register module call which registers the VHBA driver as an HBA with the operating system. These Linux embodiments also use a iSCSI utility, known as nuscsitc-pactlun, to activate individual devices. This utility either uses its own configuration or it also can probe and detect any devices. This utility uses the OS's /proc/scsi/scsi file to add devices to the iSCSI driver.

Some Solaris-based embodiments induce discovery of the non-existent local hardware by adding the devices in the sd.conf file, which is used by the Solaris OS to control which devices will be made available. For example, a line added with installation of the driver has the form: "name="sd" parent="nuscsitcp" target=1 lun=0;". After all the desired devices are configured, the user issues the drvconfig and disks commands to activate the disks. This manual step is done only once unless the target device structures are changed, for example, through addition or deletion of devices.

Some AIX embodiments induce discovery by adding PdDv and PdCn ODM entries for the adapter when the iSCSI driver is installed. Examples of these entries follow:

PdDv:
   type=sn5420
   class=driver
   subclass=iscsi
   prefix=iscsi
   devid=" "
   base=1
   has_vpd 0
   detectable=1
   chgstatus=0
   bus_ext=0
   fru=1
   led=0x0
   setno=0
      msgno=0
   catalog=" "
   DvDr=iscsidd
   Define="/usr/lib/methods/define -g -d -O"
   Configure="/usr/lib/methods/cfgiscsi"
   Change="/usr/lib/methods/chggen"
      Unconfigure="/usr/lib/methods/ucfgiscsi"
      Undefine="/usr/lib/methods/undefine"
   Start=" "
   Stop=" "
      uniquetype="driver/iscsi/sn5420"
PdCn:
   uniquetype="driver/iscsi/sn5420"
   connkey=fcp
   connwhere=" "

The PdDv entry defines the driver, its attributes, and its methodologies. Two methods, configure and unconfigure are supplied by the iSCSI protocol. The Define method will discover devices, either ones configured or it can also will probe for all. Discovered devices are then added to the Current device database.

After inducing recognition of non-existent hardware in block 230, block 240 entails the VHBA driver discovering the target storage devices accessible via storage router 130 (and any other routers that may be identified the driver's configuration file.) In the exemplary embodiment, this storage-target discovery entails sending or communicating a "send targets" command to the storage router through the TCP/IP socket initiated at block 220. (However, other embodiments may use other commands or command sequences to achieve similar results.)

In response to the "send targets" command, the exemplary storage router communicates a response over IP network 120 through to the TCP/IP socket for the VHBA driver, identifying each of the accessible target storage devices using a world-wide unique name. The identified target storage devices are then assigned a local SCSI device name from the available names reserved for the VHBA driver as a result of its being recognized as a controller by the operating system. Target-name-management module 1154 assign the local SCSI device name based on non-volatile binding file 118 to ensure consistent assignment of names for every startup. (See co-pending and co-filed U.S. patent application Ser. No. 10/143,561, Cisco Seq. No. 6122) for further details.) Exemplary execution proceeds from block 240 to block 250. (VHBA driver activity from this point forward represents normal I/O operations, with SCSI type block I/O commands communicated through the VHBA driver.)

In block 250, the VHBA driver receives a discover or device probing command from the OS (or other driver.) In the exemplary embodiment, these discover commands follow normal SCSI command path through the VHBA driver, and include one or more OS-specified physical memory addresses, such as SCSI buffer memory allocated by the OS.

The exact form of the command varies depending on the operating environment. Exemplary commands include Test Unit Ready (TUR), INQUIRY, and READ.

In block 260, the VHBA driver responds to the OS's target query by emulating a dynamic memory transfer of the SCSI target names to OS-specified physical address space. In the exemplary embodiment, this entails mapping the physical address space to a virtual address space and transferring the SCSI target names to the virtual address space. Actual implementation is a function of the local OS. For example, in the Solaris operating environment, the mapping in the memory (bp_mapin( )) to enable software access.

More generally for read-type commands, the VHBA driver have to copy the data from the IP space, such as Ethernet buffers associated with NIC 119, into the SCSI space buffers. For write-type commands, the VHBA driver sends the SCSI space buffers directly to the TCP socket. (The iSCSI driver normally does not have ownership over a buffer.) Thus, a SCSI buffer for the operating system is maintained in a iSCSI structure, permitting the SCSI command to be completed back to the OS. Exemplary execution continues at block 270.

Block 270 emulates a hardware interrupt to the OS to signal the VHBA drivers completion of the discovery operation (or other block input-output operations.) In the exemplary embodiment, the emulated hardware interrupt occurs when a command status arrives from the storage router. The specific mechanism for generating the "interrupt" generally depends on the particular operating environment. For example, Linux embodiments uses SCSIPKT→scsi_done( ); Windows embodiments uses ScsiPortNotification (RequestComplete); Solaris embodiments use SCSIPKT→pkt_comp( ), and AIX embodiments use -iodone( ).

CONCLUSION

In furtherance of the art, the inventor has presented a host bus adapter that is implemented in software and thus referred to as a "virtual" host bust adapter. One exemplary embodiment of the virtual host bus adapter includes a hardware-emulation module that makes the virtual host bus adapter appear to operating system environments as a conventional host bust adapter with dedicated hardware.

The embodiments described above are intended only to illustrate and teach one or more ways of practicing or implementing the present invention, not to restrict its breadth or scope. The actual scope of the invention, which embraces all ways of practicing or implementing the invention, is defined only by the following claims and their equivalents.

The invention claimed is:

1. A method comprising:
   loading driver software into memory for execution by a local operating system;
   establishing a TCP/IP socket connection between the local operating system and a storage router;
   inducing the local operating system to falsely recognize the driver software as having associated hardware, and thus to assign a controller number and a DMA memory address to the driver software;
   using the established TCP/IP socket connection to request identity of one or more target storage devices accessible via the storage router;
   receiving from the storage router data identifying each of a set of target storage devices accessible through the storage router using a world-wide unique name; and
   assigning local SCSI device names to each of the identified target storage devices from available names reserved for the driver software as a result of its being recognized as a controller by the local operating system.

2. The method of claim 1, wherein inducing the local operating system to falsely recognize the driver software as having associated hardware, includes at least one of: issuing a ScsiPortInitialize call; issuing a scsi_register_module call, or invoking a iSCSI nuscsitcpactlun utility, or adding a device in an sd.conf file.

3. The method of claim 1, wherein the available names reserved for the driver software are based on names present in a non-volatile binding file.

4. A machine readable medium comprising instructions for:
   loading driver software into memory for execution by a local operating system;
   establishing a TCP/IP socket connection between the local operating system and a storage router;
   inducing the local operating system to falsely recognize the driver software as having associated hardware, and thus to assign a controller number and a DMA memory address to the driver software;
   using the established TCP/IP socket connection to request identity of one or more target storage devices accessible via the storage router;
   receiving from the storage router data identifying each of a set of target storage devices accessible through the storage router using a world-wide unique name; and
   assigning local SCSI device names to each of the identified target storage devices from available names reserved for the driver software as a result of its being recognized as a controller by the local operating system.

5. The medium of claim 4, wherein the available names reserved for the driver software are based on names present in a non-volatile binding file.

6. Apparatus comprising:
   means for loading driver software into memory for execution by a local operating system;
   means for establishing a TCP/IP socket connection between the local operating system and a storage router;
   means for inducing the local operating system to falsely recognize the driver software as having associated hardware, and thus to assign a controller number and a DMA memory address to the driver software;
   means for using the established TCP/IP socket connection to request identity of one or more target storage devices accessible via the storage router;
   means for receiving from the storage router data identifying each of a set of target storage devices accessible through the storage router using a world-wide unique name; and
   means for assigning local SCSI device names to each of the identified target storage devices from available names reserved for the driver software as a result of its being recognized as a controller by the local operating system.

7. The apparatus of claim 6, wherein the available names reserved for the driver software are based on names present in a non-volatile binding file.

* * * * *

UNITED STATES PATENT AND TRADEMARK OFFICE
CERTIFICATE OF CORRECTION

PATENT NO. : 7,240,098 B1  
APPLICATION NO. : 10/143456  
DATED : July 3, 2007  
INVENTOR(S) : Mansee Page 1 of 1

It is certified that error appears in the above-identified patent and that said Letters Patent is hereby corrected as shown below:

On the Title page, item (57), under "Abstract", in column 2, line 12, after "host" delete "bust" and insert -- bus --, therefor.

In column 1, line 67, after "Reserved" insert -- . --.

In column 2, line 6, after "network" insert -- . --.

In column 5, line 1, after "across" delete "EP" and insert -- IP --, therefor.

In column 6, line 8, delete "has_vpd 0" and insert -- has_vpd=0 --, therefor.

Signed and Sealed this

Sixteenth Day of October, 2007

JON W. DUDAS  
*Director of the United States Patent and Trademark Office*